Sept. 8, 1953   G. G. OLDHAM   2,651,286
COATING MACHINE FOR EDIBLE PRODUCTS
Filed Aug. 12, 1949   2 Sheets-Sheet 2
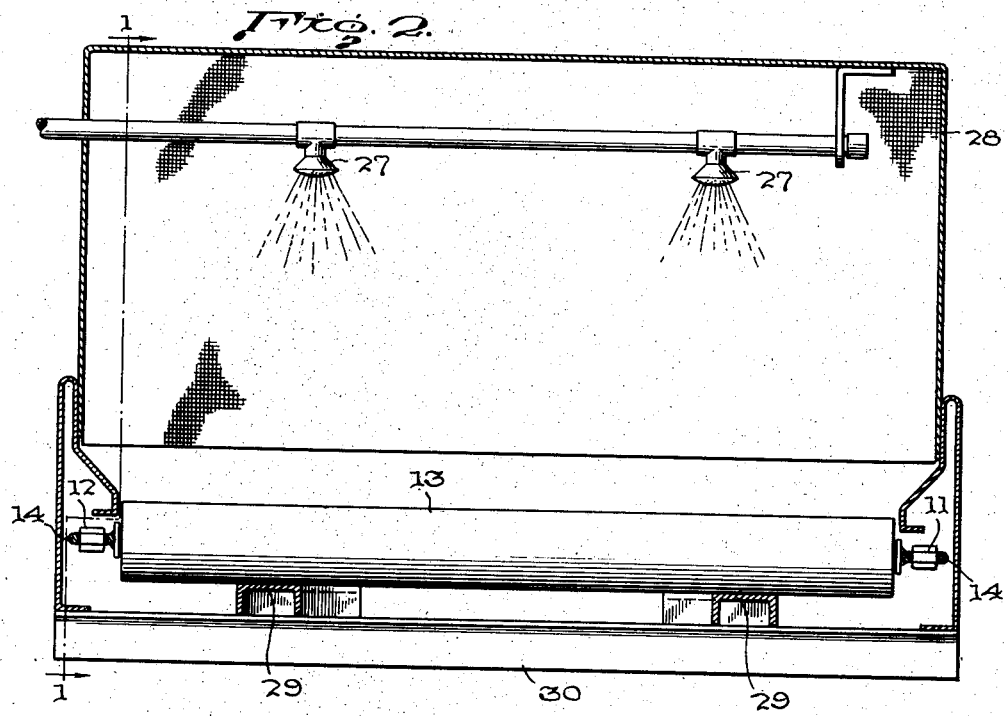
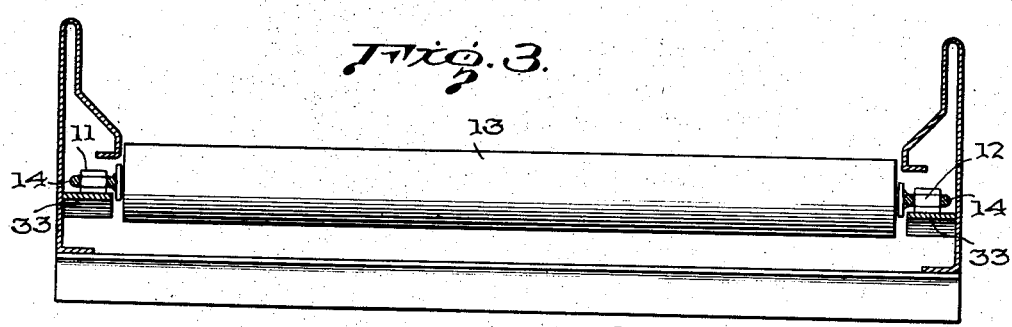
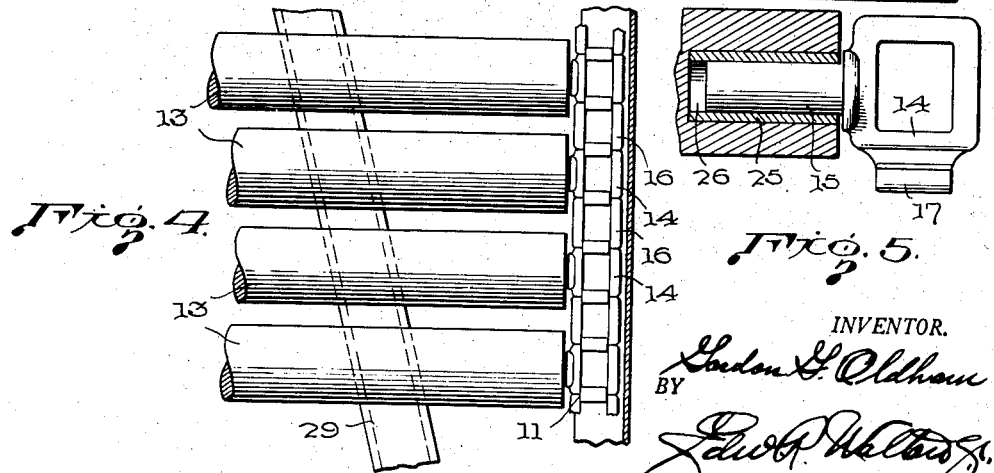
INVENTOR.
Gordon G. Oldham
BY
ATTORNEY Patented Sept. 8, 1953

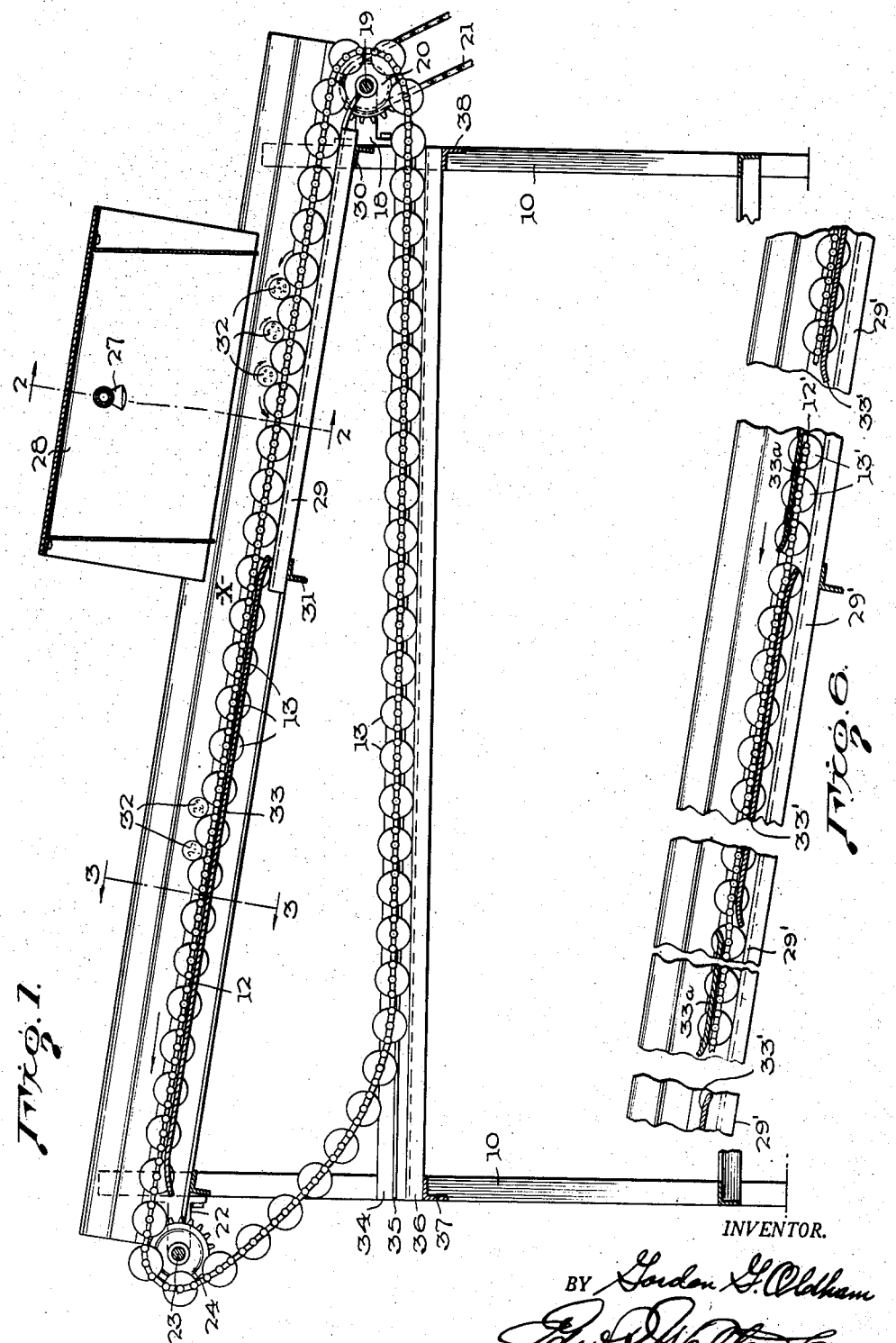

2,651,286

UNITED STATES PATENT OFFICE 2,651,286

COATING MACHINE FOR EDIBLE PRODUCTS

Gordon G. Oldham, Leesburg, Fla., assignor to American Machinery Corporation, Orlando, Fla., a corporation of Florida Application August 12, 1949, Serial No. 109,970

2 Claims. (Cl. 118—24)

1

This invention relates to a method of and apparatus for applying liquid materials to the surfaces of fruits, vegetables or other products.

Heretofore fruits, vegetables or the like have been conveyed by an endless conveyor of the roller type through a station where the fruits and vegetables have been given a surface coating of liquid material, as they have been moved through the station by the conveyor, and then conveyed by the conveyor to a discharge point where they are discharged from the conveyor. During the said conveying of the fruits or vegetables through the treating station and to the discharge point, the rollers of the conveyor have been caused to rotate and, as a consequence, the fruit or vegetables on the conveyor have been rotated and, thus, their entire surfaces are exposed to the treating device at the treating station so that the treating liquid material reaches all points on their surfaces. However, such rotation of the rollers and the constant turning of the fruits and vegetables thereon between the treating station and the discharge end of the conveyor retards the free dripping of excess liquid material from the fruits and vegetables and, if a settable emulsion, such as a wax emulsion, has been applied to the surfaces of the fruits and vegetables at the treating station, this turning of the fruits and vegetables on the rollers between the treating station and the discharge end of the conveyor retards the setting of the applied settable material. As a result the coating on the surface of such fruits and vegetables is not sufficiently dry or has set to a degree desirable for the further handling of the fruits and vegetables when discharged from said conveyor, as upon another conveyor or surface; and the coating becomes unduly scuffed or marred over wide areas, due to such discharge or transfer, detrimental to good shrinkage or mold control and presents an undesirable appearance on fruit, such as oranges, instead of a smooth, continuous encasing film.

Accordingly, a principal object of this invention is, broadly, to provide an apparatus having a roller conveyor whereby fruits and vegetables and other products, to which a liquid has been applied, may be moved for a distance on said roller conveyor through a treating station without the fruits and vegetables turning on the conveyor to facilitate the dripping of excess liquid and/or to hasten the setting of emulsion on their surfaces while the fruits and vegetables are carried by the conveyor.

Another object of this invention is to provide

2 an apparatus of the character referred to and which is equipped with simple and effective means for controlling the rotation and the non-rotation of the rollers on the conveyor at the times and during the movements stated above.

A further object of this invention is to provide a method of treating the surfaces of fruits and vegetables and the like with liquid materials, including the application of liquid materials to the surfaces of the fruits, vegetables or other products and the removal of excess liquid and the setting of emulsions on the surfaces of the fruits, vegetables or other products, and which method is simple and inexpensive to carry out.

A stlil further object of the invention is the provision of a simple machine which is operated to turn the fruits and vegetables as liquid material is being applied to their surfaces and to hold the fruits and vegetables at rest on the conveyor while they are then carried farther through the machine to a point of discharge.

Other objects of this invention will be in part obvious and in part pointed out hereinafter.

In accordance with this invention I employ an arrangement whereby the rollers of a roller-conveyor—upon which the fruits, vegetables or the like (whether of a substantially spherical rollable shape or of a non-rollable irregular shape) are carried in the valleys between the rollers and are turned by the rotating rollers as they are moved through the machine—are caused not to rotate for some distance or may be intermittently rotated and non-rotated, according to the product treated, so that the products will be stationary on the rollers for that distance in order that excess liquid material can drip freely from the products and, if settable liquid material is used such as wax emulsion, it may set or start its initial drying on the surfaces of the products before leaving the conveyor, it being understood the said roller conveyor is used in association with a device for applying liquid material to the surfaces of fruit, vegetables or like products on the conveyor, which device may be separate from the conveyor machine of the invention or may overlie the receiving end thereof.

The invention accordingly consists in the features of construction, combinations of elements and arrangements of parts which will be more clearly pointed out hereinafter and the scope of the application of which will be pointed out in the claims that follow.

In order that a clearer understanding of this invention may be had attention is hereby directed to the accompanying drawings, forming a part of this application and illustrating certain possible embodiments of this invention, and in which:

Figure 1 is a longitudinal sectional view of one form of an apparatus embodying this invention and taken substantially on line 1—1 of Figure 2;

Figure 2 is a sectional view through an upper portion of the apparatus, and is taken on the line 2—2 of Figure 1;

Figure 3 is a sectional view through the upper flight of the conveyor at a different place, and is taken on the line 3—3 of Figure 1;

Figure 4 is a top plan view of a fragment of the upper flight showing a portion of one of the roller engaging members which cause the conveyor rollers to rotate;

Figure 5 is a plan view of one of the chain links on which the rollers are journaled, and including a portion of a roller shown in section; and Figure 6 is a fragmentary view similar to Figure 1 showing a variation of a roller conveyor machine wherein the roller contacting and rotating members extend throughout the machine and the rollers are raised out of contact therewith for a distance.

Similar reference characters refer to similar parts throughout the several views of the drawings.

Referring to the drawings, there is framework 10 which supports an endless roller conveyor well known in the art. The conveyor may comprise a pair of endless sprocket chains 11 and 12 in which are journaled rollers 13, preferably wooden, which extend between the chains. The chains are composed of links 14 which are formed with journal pins 15 extending sidewise therefrom and spacing links 16 between the links 14. Each link is formed with a hook 17 whereby it may be pivotally connected with an adjacent link. A live-roller conveyor of this type is well known in the art and is a common commercial item varying in construction according to the design of its manufacture. Consequently, any live-roller conveyor of the type indicated may be employed.

Secured to the framework 10 at one end are brackets 18 which rotatably support a shaft 19 carrying two sprockets 20 which engage the links of the two endless chains 11 and 12 at one end. The shaft is driven by any suitable means, indicated generally at 21, to drive the sprockets 20 and the chains 11 and 12. Brackets 22 secured to the framework at the opposite end rotatably support a shaft 23 carrying sprockets 24 which engage the links of the two chains at their other ends. The shaft 23 preferably is at a higher elevation than shaft 19 so that the upper flight of the conveyor will be on an incline.

The shaft 19 is driven in the direction which will cause the conveyor to travel from sprockets 20 to sprockets 24; that is, the upper flight of the conveyor will travel upwardly. The portion of the conveyor toward the sprockets 20 is considered the intake or oncoming end of the conveyor and the opposite end portion of the conveyor is considered the discharge end.

The journal pins 15 of the links 14 are entered into metal bushings 25 retained in bores 26 formed in the ends of the rollers at the center so that the rollers are journalled on these link pins and may rotate thereon.

Over the upper flight of the conveyor toward its intake end may be supported by any suitable means, not shown, a device for applying liquid material, such as water or liquid wax emulsion or the like, to products, for instance fruits, vegetables or the like, as they are carried past the device by the conveyor, said device being represented by spray nozzle 27 and spray hood 28. This is particularly useful in the treatment of oranges and certain other fruits and vegetables. In cases where the treating liquid has been applied by some other device, the device 27—28 is not used and the product may be delivered directly to the rollers 13. Also in some cases it is desirable to rotate the product before bringing the rollers 13 to rest for allowing a settable liquid to set.

At the intake end of the conveyor two members 29, shown in the form of inverted channel irons, are mounted on the framework 10 as by being secured to cross frame pieces 30 and 31. As shown in Figs. 1 to 5, these members 29 extend from the vicinity of the sprockets 20 all the way under the spray hood 28 of the liquid applying device to a point approximately at $x$ (Fig. 1) and are so positioned relatively to the upper flight of the conveyor rollers 13 that these rollers will rest on these members with such frictional engagement therewith and, as the conveyor travels, the rollers 13 will be rolled as they travel along on the members 29 and by their rotation will turn the products which are being carried on the rollers. By so turning the products, indicated at 32, as they are passed under the spray hood 28, the coverage of their entire surfaces with the sprayed liquid material is insured. The rotation producing members 29 are preferably angularly related to the roller axes to equalize the wear on the roller surfaces, although they may be disposed substantially parallel with the sides of the framework 10 and positioned under the ends of the rollers 13.

Extending backwardly from the discharge end of the conveyor in the vicinity of the sprockets 24 to points, preferably, where the conveyor passes from under the spray hood 28 (when one is employed), are two horizontally positioned track members 33 supported respectively on opposite sides of the framework 10 and each positioned to receive on its upper surface and to support slidingly thereon one of the chains 11 and 12 in a substantially straight line without contacting the rollers 13. However, should the members 29 extend to or well toward the discharge end of the machine, the track members 33 are vertically offset relative to the members 29 to raise the rollers 13 out of contact with the members 29 as shown in Fig. 6. In Fig. 6, the conveyor chains are designated 12', the conveyor rollers 13', the track members 33' and the roller contacting member 29'.

The arrangement is such that the rollers 13 will maintain rolling engagement with roller rotating or contacting members 29 to cause the products, carried on the rollers to turn thereon until the conveyor has carried the products through the effective range of the spray device and, then, the contact between the rollers 13 or 13' and the members 29 or 29' will cease and, instead, the chains 11 and 12 or chains 12' will pass onto and be supported by and slide on the chain supporting tracks 33 or 33' until the chains and the rollers supported thereby arrive at the discharge end of the conveyor, as shown in Figure 1, or will be again brought or repeatedly brought into contact with the member 29' as shown in Figure 6.

As shown in Figure 6, the track 33' may be in a plurality of spaced sections to intermittently raise the conveyor rollers 13' from the member 29', there being as many of these sections 33' as may be desired for a particular product, so as to allow intermittent rotation and non-rotation of the roller 13' through the conveyor machine which is desirable in treating some vegetables. Hold-down guide rails 33a are positioned over the chains 12' between the track sections 33' to lower the same and hold the rollers in contact with the member 29' to effect rotation of the rollers 13' in their travel between the track-section 33'.

If desired, the lower flight of the conveyor may be supported by track members 34 mounted on the framework 10 and adapted to receive and support on their track surfaces 35 the chains 11 and 12, or instead the flight may be supported by bars 36 mounted on cross pieces 37 and 38 secured to the framework 10 and on which the rollers 13 ride and are supported; or by both the chain supporting tracks 34 and the roller supporting bars 36.

The operation of the apparatus should be apparent from the above. The conveyor is started in continuous operation and, with respect to Fig. 1, the products are fed upon the conveyor at its intake end and the applicator 27—28 started to dispense the liquid material and the conveyor carries the deposited products through the effective range of the spray device, during which travel the rollers of the conveyor rotate to keep the products turning thereon, and then the conveyor carries the products to the discharge end of the conveyor while the rollers are not rotating on the chains and the products are at rest on the conveyor so that excess liquid is free to drip and liquid emulsion is free to set or to undergo initial hardening on the surfaces of the products. Should the applicator 27—28 not be used, the previous sprayed or coated products are delivered to the conveyor at its intake end and initially turned by the rollers and then the turning movement is discontinued when that portion of the conveyor engages and is supported by the tracks 33. The operation of the modification, in Fig. 6, is the same as in Fig. 1 except that the rollers 13' of the conveyor by reason of the several track sections 33' and the hold-down guides 33a, intermittently rotate during the travel of the upper flight of the conveyor and, of course, the spray device 27—28 may and may not be employed therewith.

As many changes may be made in the above construction and as many different embodiments of this invention may be made without departing from the scope of this invention, it is to be understood that all matter contained in the above description or shown in the accompanying drawings be interpreted as illustrative and not in a limiting sense.

That which is claimed as new is:

1. In an apparatus for applying a coating to objects, the combination with a supporting frame, a traveling live-roller conveyor having side chain-like members, spaced means on said frame and over which said chain-like members are trained to provide a generally horizontal flight-bed upon which said objects are received thereon at one end portion and discharged therefrom at its other end portion, means for driving said conveyor, a coating applicator positioned over said flight-bed at its receiving end portion and extending thereover for a distance to apply said coating to said objects, of elongated members carried by and substantially longitudinally of said frame and disposed under and in contact with said rollers of the flight-bed for a distance forwardly from its receiving end and terminating said contact at a point substantially where said conveyor emerges from said applicator in its travel so as to rotate said rollers during their travel under said applicator and render them non-rotating therebeyond, and track means on the frame positioned under each of said chain-like members of said flight-bed for a distance extending beyond coating applicator toward the discharge end portion of said flight-bed for supporting said bed while said rollers thereof are not rotating and while excess coating material is draining from said objects and said coating is setting or hardening on said objects prior to its discharge from said flight-bed.

2. The subject-matter of claim 1 characterized by said elongated members extending beyond the receiving end of said flight-bed toward the discharge end thereof for contact with said rollers; and by said track members being disposed on the frame at spaced intervals under each chain-like member of said flight-bed and being offset upwardly relative to said elongated members for supporting said rollers out of rolling contact therewith to discontinue rotation of said rollers and, hence, of said objects; and by hold-down guide means extending between said intervals of track and overlying said chain-like members and positioned to maintain said rollers between said intervals of the track in contact with said elongated members, whereby said rollers spanning the intervals between the track may be rotated during the travel of the flight-bed.

GORDON G. OLDHAM.

References Cited in the file of this patent

UNITED STATES PATENTS

| Number | Name | Date |
|---|---|---|
| 1,414,674 | Skinner | May 2, 1922 |
| 1,468,804 | Contant | Sept. 25, 1923 |
| 2,070,980 | Wyland | Feb. 16, 1937 |
| 2,285,841 | Sharma | June 9, 1942 |